(12) United States Patent
Tanaka

(10) Patent No.: US 8,970,917 B2
(45) Date of Patent: Mar. 3, 2015

(54) IMAGE PROCESSING APPARATUS AND IMAGE PROCESSING METHOD

(71) Applicant: KYOCERA Document Solutions Inc., (JP)

(72) Inventor: Kunihiko Tanaka, Osaka (JP)

(73) Assignee: KYOCERA Document Solutions Inc. (JP)

(\*) Notice: Subject to any disclaimer, the term of this patent is extended or adjusted under 35 U.S.C. 154(b) by 0 days.

(21) Appl. No.: 13/950,459

(22) Filed: Jul. 25, 2013

(65) Prior Publication Data

US 2014/0036320 A1 Feb. 6, 2014

(30) Foreign Application Priority Data

Jul. 31, 2012 (JP) ................................. 2012-169250

(51) Int. Cl.
| | | |
|---|---|---|
| G06K 9/40 | (2006.01) | |
| H04N 1/38 | (2006.01) | |
| H04N 1/40 | (2006.01) | |
| H04N 1/00 | (2006.01) | |

(52) U.S. Cl.
CPC ....... *H04N 1/40062* (2013.01); *H04N 1/00005* (2013.01); *H04N 1/00037* (2013.01); *H04N 1/00047* (2013.01); *H04N 1/0005* (2013.01); *H04N 1/00068* (2013.01); *H04N 1/00076* (2013.01); *H04N 1/0044* (2013.01); *H04N 1/00803* (2013.01); *H04N 1/00811* (2013.01); *H04N 1/38* (2013.01); *H04N 2201/0094* (2013.01)
USPC ........... 358/465; 358/464; 358/3.21; 382/274

(58) Field of Classification Search
None
See application file for complete search history.

(56) References Cited

U.S. PATENT DOCUMENTS

| 4,723,173 A | * | 2/1988 | Tanioka | 358/3.21 |
| 7,376,267 B2 | * | 5/2008 | Toda | 382/166 |
| 2004/0076337 A1 | * | 4/2004 | Nishida | 382/274 |
| 2012/0206776 A1 | * | 8/2012 | Sato | 358/465 |

FOREIGN PATENT DOCUMENTS

| JP | H07-023156 | 1/1995 |
| JP | H08-265548 | 10/1996 |
| JP | H11-284846 | 10/1999 |
| JP | 2000-201254 | 7/2000 |
| JP | 2005-279094 | 10/2006 |
| JP | 2008-219810 | 9/2008 |
| JP | 2010-254844 | 11/2010 |

\* cited by examiner

*Primary Examiner* — Huo Long Chen
*Assistant Examiner* — Moustapha Diaby

(57) ABSTRACT

An image processing apparatus according to an aspect of the present disclosure includes: an identifying area dividing unit configured to divide the image data into plural identifying areas; a binarization processing unit configured to perform a binarization process for the identifying areas with respective binarization threshold values preset for the identifying areas; a black pixel number identifying unit configured to identify whether or not the numbers of pixels with a density value of black in the respective identifying area exceed respective number threshold values preset for the identifying areas; and a blank sheet identifying unit configured to identify that the image data is image data of a blank sheet if the black pixel number identifying unit identifies that none of the numbers of pixels with the density value of black in the respective identifying areas exceeds the number threshold value.

5 Claims, 8 Drawing Sheets

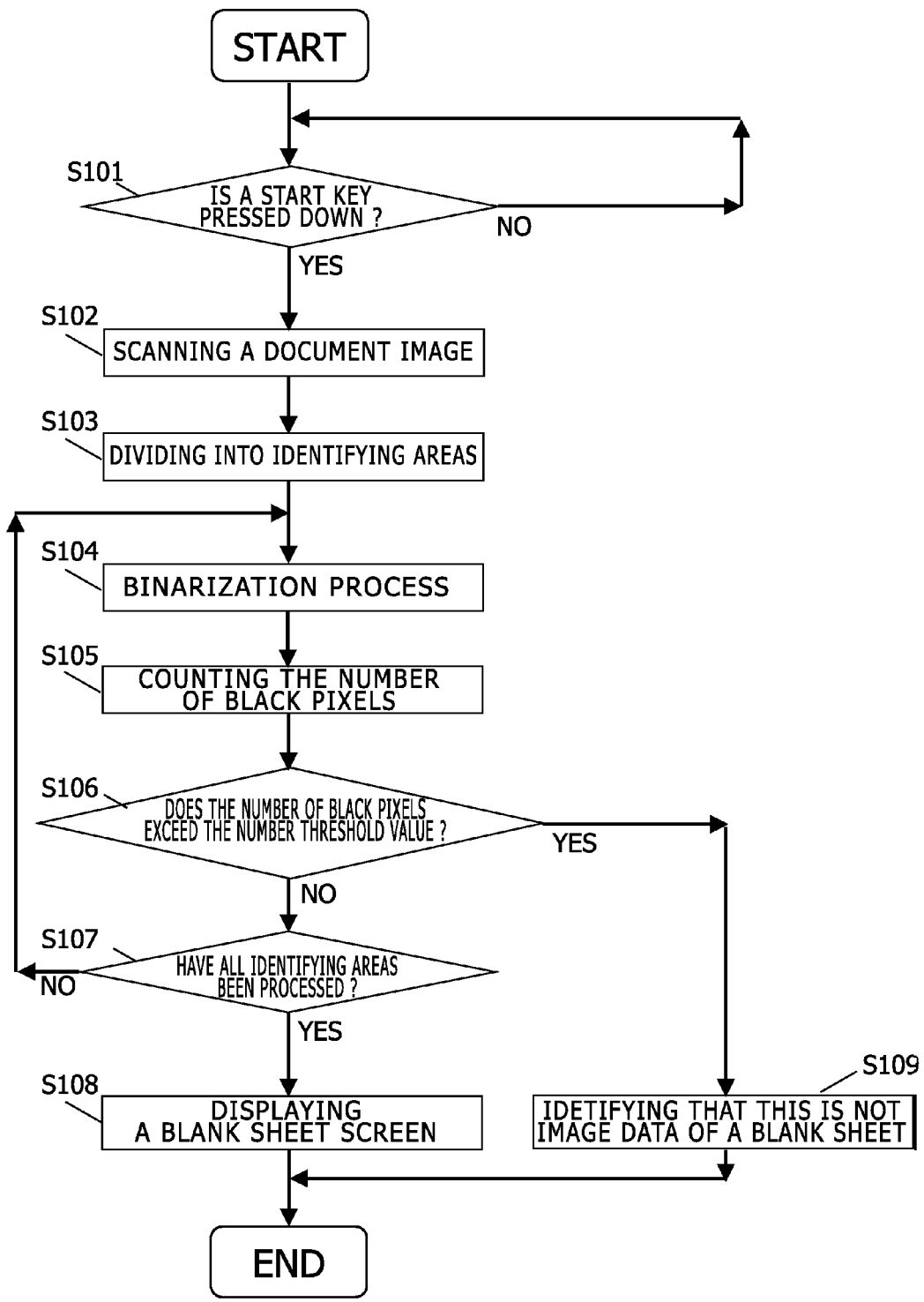

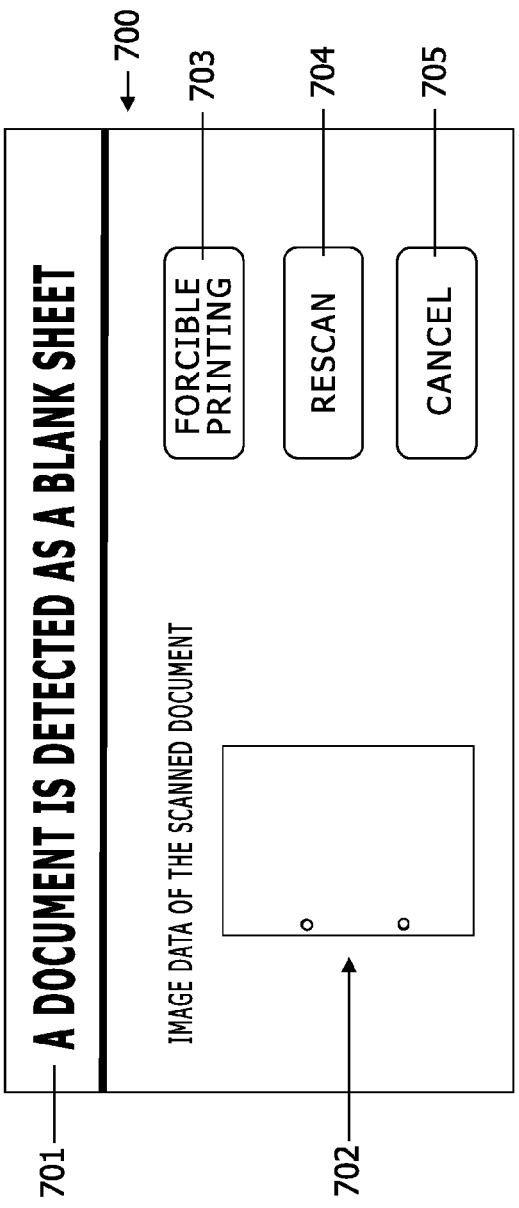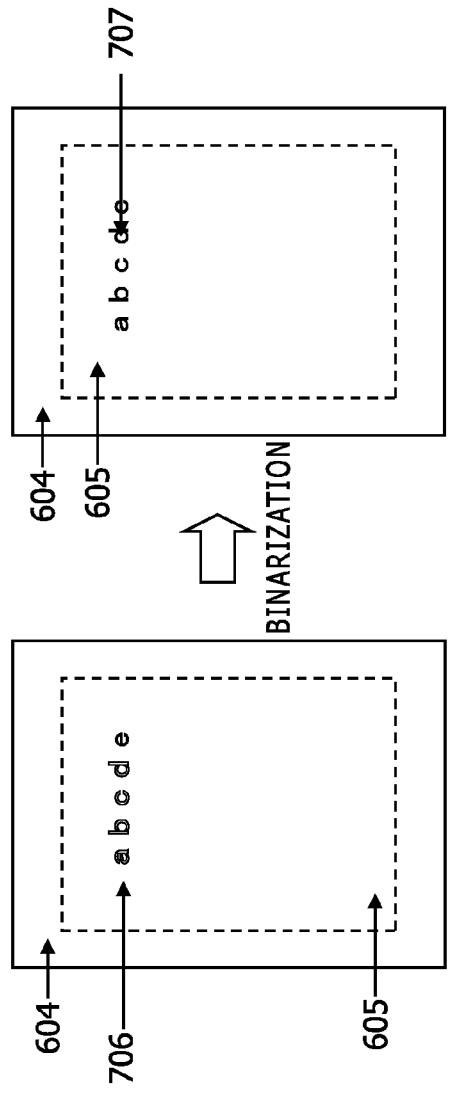

IMAGE PROCESSING APPARATUS AND IMAGE PROCESSING METHOD

CROSS-REFERENCE TO RELATED APPLICATIONS

This application relates to and claims priority rights from a Japanese Patent Application No. 2012-169250, filed on Jul. 31, 2012, the entire disclosures of which are hereby incorporated by reference herein.

BACKGROUND

1. Field of the Invention

The present disclosure relates to an image processing apparatus and an image processing method.

2. Description of the Related Art

In image processing apparatus such as an MFP (Multi Function Peripheral), an image scanning unit such as a scanner scans a document image and generates image data of the document image, and the image data can be outputted to a sheet by an image forming unit or transmitted by a facsimile communication unit.

Even if the document is a blank sheet (i.e. blank document) which has no characters, an ordinary image processing apparatus usually outputs the image data of the document image as is to a sheet or performs facsimile transmission of the image data to a recipient. Printing and facsimile transmission based on the image data of the blank document image rise problems such as waste of paper sheets for printing and confusion at the recipient.

Therefore, some techniques have been proposed to identify whether the document is a blank sheet or not on the basis of image data of the document image.

For example, a copy machine includes a performing unit which performs a copy action of a document image to a single side and/or double sides of a paper sheet, and a detecting unit which detects a blank side among double sides of the document sheet. This copy machine also includes an identifying unit which identifies whether the document sheet is printed on double sides, whether the document sheet is printed only on a single side, and whether double sides of the document sheet are blank on the basis of the detection results of the detecting unit, a control unit which controls the performing unit on the basis of the identification result of the identifying unit to perform a copy action totally unified to single-sided or double-sided, and an outputting unit which outputs the copied paper sheet. The control unit of this copy machine is characterized by canceling the copy action of the performing unit of a blank side in the document sheet. It is described that therefore, it is possible to cancel unnecessary copy action of a blank side in the document sheet.

Further, a facsimile machine scans and transmits plural sheets of a double sided document. This facsimile machine includes a blank page detecting unit which detects a blank page in image information of the scanned plural pages, a page arrangement processing unit which arranges residual pages except the blank pages detected by the blank page detecting unit among the plural pages in its page order, and a transmitting unit which transmits image information of plural pages arranged by the page arrangement processing unit on the basis of the arrangement result. It is described that image information of plural pages except blank pages arranged in the page order is transmitted and image information of plural pages except specified pages arranged in the page order is transmitted, and therefore, unnecessary transmission is not performed.

Further, an image processing apparatus includes an image scanning unit which optically scans image information on a document, an image processing unit which performs a predetermined image process for the image information scanned by the image scanning unit, and an image outputting unit which outputs the image information for which the image processing unit has been performed the image process to a sheet. This image processing apparatus also includes a blank sheet identifying area setting unit which sets a blank sheet identification area used for identifying whether the document is a blank document or not, a blank document identifying unit which obtains the image information corresponding to the blank sheet identification area from the image scanning unit and identifies whether the document is a blank document or not, and a control unit which controls the image processing unit and the image outputting unit to cancel the later image forming action if it is identified that the document is a blank document. It is described that therefore, image forming is not performed for an unnecessary blank document, it is possible to reduce an unnecessary sheet for the blank document and identify whether the document is a blank document or not in a shorter time than a time required to scan all areas of all the document, and moreover blank sheet identification is possible for the document more quickly than using a fixed blank sheet identification area set by a user.

Further a blank sheet identifying apparatus includes a first identifying unit which identifies whether a document put on a reading area is a blank sheet or not on the basis of a document signal corresponding to a scanned whole area of the scanning area, an effective image area setting unit which sets an effective image area cut out as a predetermined area at an edge area from the reading area if the first identifying unit identifies that the document is not a blank sheet, and a second identifying unit which identifies whether identifies whether the document is a blank sheet or not on the basis of an image signal corresponding to the effective image area. It is described that even if the first identifying unit identifies that the document is not a blank sheet, the second identifying unit performs additional identification except for a part in which identification error may occur, and therefore, it is possible to properly perform blank sheet identification.

However, image data which a user wants to identify a blank sheet is not limited to image data of a sheet of which the whole area is blank.

For example, a document has a punch hole in an edge part (e.g. left edge part). When a document image of the document is scanned, a dark circle mark of the punch hole appears in an edge part of the document image. Due to this dark mark, it is not identified that the document image is a whole blank sheet. In general, if a document has a punch hole in an edge part but content of the document is blank, it is better to identify that the document is a blank sheet and not to output the document.

Further, to detect a document which contains the punch hole as a blank sheet, for example, a binarization threshold value is set close to the density value of white, here "255", so as to detect a pixel with a low density value of gray as a pixel with the density value of white. However, in such a manner, for example, an image of a pale character such as a character written with a pencil is binarized to an image with the density value of white, and therefore, in such a manner, the document may be erroneously detected as a blank sheet.

Further, although the technique of the aforementioned blank sheet identifying apparatus can limit the area for blank sheet identification to a predetermined area, this limit may result in a trouble.

For example, since the number of pages and a page number are recorded in an edge part, mainly, a bottom edge part, a document which contains only a page number may be detected as a blank sheet and not outputted. Consequently, if image data is read from plural documents which contain respective serial page numbers, the document detected as a blank sheet is missing and at the missing document the continuity of the page numbers is broken. Moreover, a page number is usually printed as a very small character, and therefore, even if an area which contains only a page number is included into a blank sheet detection area, since the number of pixels with the density value of black in its image is very small, the blank sheet detection is not avoided. Thus, the aforementioned techniques can not solve the aforementioned problems.

SUMMARY

An image processing apparatus according to an aspect of the present disclosure includes: an identifying area dividing unit configured to divide the image data into plural identifying areas; a binarization processing unit configured to perform a binarization process for the identifying areas with respective binarization threshold values preset for the identifying areas; a black pixel number identifying unit configured to identify whether or not the numbers of pixels with a density value of black in the respective identifying area exceed respective number threshold values preset for the identifying areas; and a blank sheet identifying unit configured to identify that the image data is image data of a blank sheet if the black pixel number identifying unit identifies that none of the numbers of pixels with the density value of black in the respective identifying areas exceeds the number threshold value.

An image processing method according to an aspect of the present disclosure includes the steps of: dividing the image data into plural identifying areas; performing a binarization process for the identifying areas with respective binarization threshold values preset for the identifying areas; identifying whether or not the numbers of pixels with a density value of black in the respective identifying area exceed respective number threshold values preset for the identifying areas; and identifying that the image data is image data of a blank sheet if it is identified that none of the numbers of pixels with the density value of black in the respective identifying areas exceeds the number threshold value.

These and other objects, features and advantages of the present invention will become more apparent upon reading of the following detailed description along with the accompanied drawings.

BRIEF DESCRIPTION OF THE DRAWINGS

FIG. 5 shows a flowchart which indicates execution procedures in the embodiment of the present disclosure;

FIG. 7A shows an example of a blank sheet screen in the embodiment of the present disclosure, and FIG. 7B shows an example of image data and a binarization process in the embodiment of the present disclosure.

DETAILED DESCRIPTION

Hereinafter, referencing to the attached drawings, an embodiment will be explained of an image processing apparatus and an image processing method according to an aspect of the present disclosure.

<Image Processing Apparatus>

Figure 1:
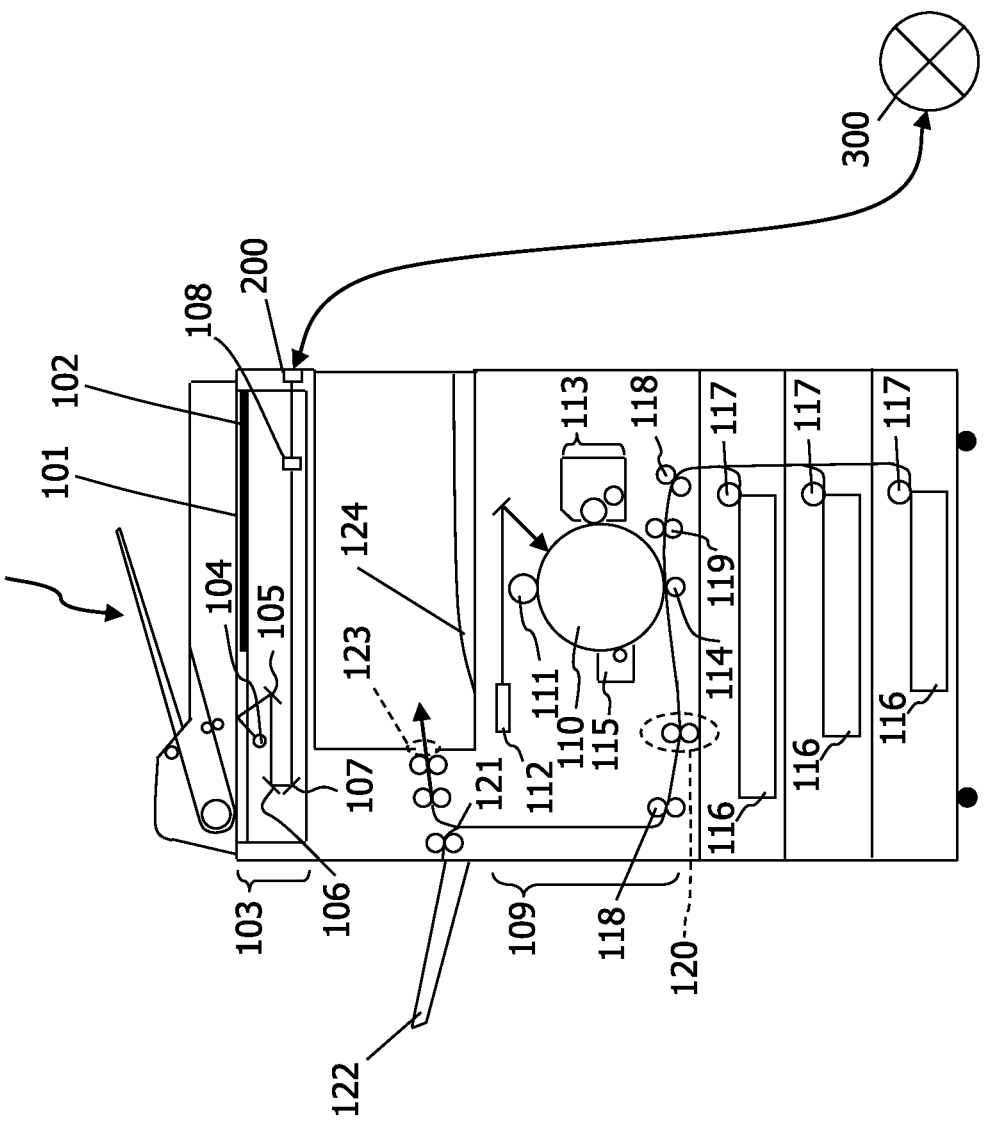
FIG. 1 shows a schematic diagram which indicates a whole internal configuration of a multi function peripheral according to an embodiment of the present disclosure.

In the following part, an image processing apparatus according to an embodiment of the present disclosure is explained. FIG. 1 shows a schematic diagram which indicates a whole internal configuration of a multi function peripheral according to an embodiment of the present disclosure.

This image processing apparatus is, for example, a printer machine, a scanner machine, a multi function peripheral which includes a printer, a copier, a scanner, a facsimile and so forth, or the like, and has a copy function, a scanner function, a facsimile function, a printer function, and so forth.

In the following part, when a user uses a copy function, an action of a multi function peripheral (MFP) 100 is briefly explained.

When a user uses the multi function peripheral 100, the user puts a document on a platen glass 101 which is arranged on the top surface of its main body unit. Subsequently, the user uses an operation unit 102 (an operation panel) arranged near the platen glass 101 and inputs a setting condition of image forming to an operation screen of the operation unit 102. Subsequently, when the user presses down a start key arranged in the operation unit 102, the multi function peripheral 100 starts image forming (i.e. a printing process).

Subsequently, in an image scanning unit 103, light irradiated from a light source 104 reflects on the document put on the platen glass 101. The reflected light is guided to an imaging sensor 108 by mirrors 105, 106, and 107. The imaging sensor 108 performs photoelectric conversion for the guided light, and generates image data corresponding to the document.

For the generated image data, a blank sheet identifying process is performed before performing image forming. The blank sheet identifying process is to identify whether the generated image data is image data of a blank sheet of which almost all pixels are white. According to a result of the blank sheet identifying process, if the generated image data is image data of a blank sheet, then the image forming is suspended, and it is displayed on the operation unit 102 that the document is a blank sheet. Otherwise, if the generated image data is not image data of a blank sheet, that is, image data of a document such as a text or a photograph, then the image forming is continued.

Meanwhile, an image forming unit 109 is a unit which forms a toner image based on the generated image data. The image forming unit 109 includes a photo conductor drum 110. The photo conductor drum 110 rotates at a constant speed in a predetermined direction, and in periphery of it, devices and units are arranged such as a charging device 111, an exposure unit 112, a developing device 113, a transferring device 114, and a cleaning unit 115.

The charging device 111 uniformly charges a surface of the photo conductor drum 110. The exposure unit 112 forms an electrostatic latent image on the charged surface of the photo conductor drum 110 by irradiating a laser light based on the image data. The developing device 113 forms a toner image by attaching toner to the formed electrostatic latent image. The formed toner image is transferred to a recording medium (e.g. a paper sheet) by the transferring device 114. The cleaning unit 115 removes residual unnecessary toner on the surface of the photo conductor drum 110. A series of these processes is performed while the photo conductor drum 110 is rotating.

The sheet is fed and transported from plural paper feed cassettes 116. To transport the sheet, the sheet is fed from any one of the paper feed cassettes 116 to a transportation path by a pickup roller 117. Sheets with different paper types are stored in the respective paper feed cassettes 116, and fed is a sheet with a paper type corresponding to a setting value in a setting condition of image forming.

The sheet fed into the transportation path is transported inbetween the photo conductor drum 110 and the transferring device 114 by a transporting roller 118 and a registration roller 119. On the transferred sheet, a toner image is transferred by the transferring device 114, and then the sheet is transferred to a fuser device 120.

When the sheet on which the toner image has been transferred passes between a heating roller and a pressuring roller in the fuser device 120, heat and pressure are applied to the toner image, and consequently, the toner image is fixed on the sheet. An optimal heating value of the heating roller corresponding to the paper type is set to perform fixing properly. When the toner image is fixed on the sheet in this manner, the image forming is finished, and the sheet is transported to a transportation path switching unit 121 by the transporting roller 118.

According to a switching instruction by the multi function peripheral, the transportation path switching unit 121 guides the sheet to either an output tray 122 arranged on a side surface of the main body unit or an inside tray 124 arranged inside of the main body unit. The sheet is piled and stored either on the output tray 122 or via a paper outlet 123 on the inside tray 124. In the aforementioned manner, the main body unit of the multi function peripheral 100 provides an image forming function to a user.

In another type of image forming such as facsimile transmission, the generated image data is transmitted via a network 300 for a predetermined destination by a communication unit 200. For example, if the destination is a facsimile machine connected to the network 300 so as to enable to communicate, the destination is identified from a facsimile number.

Figure 2:
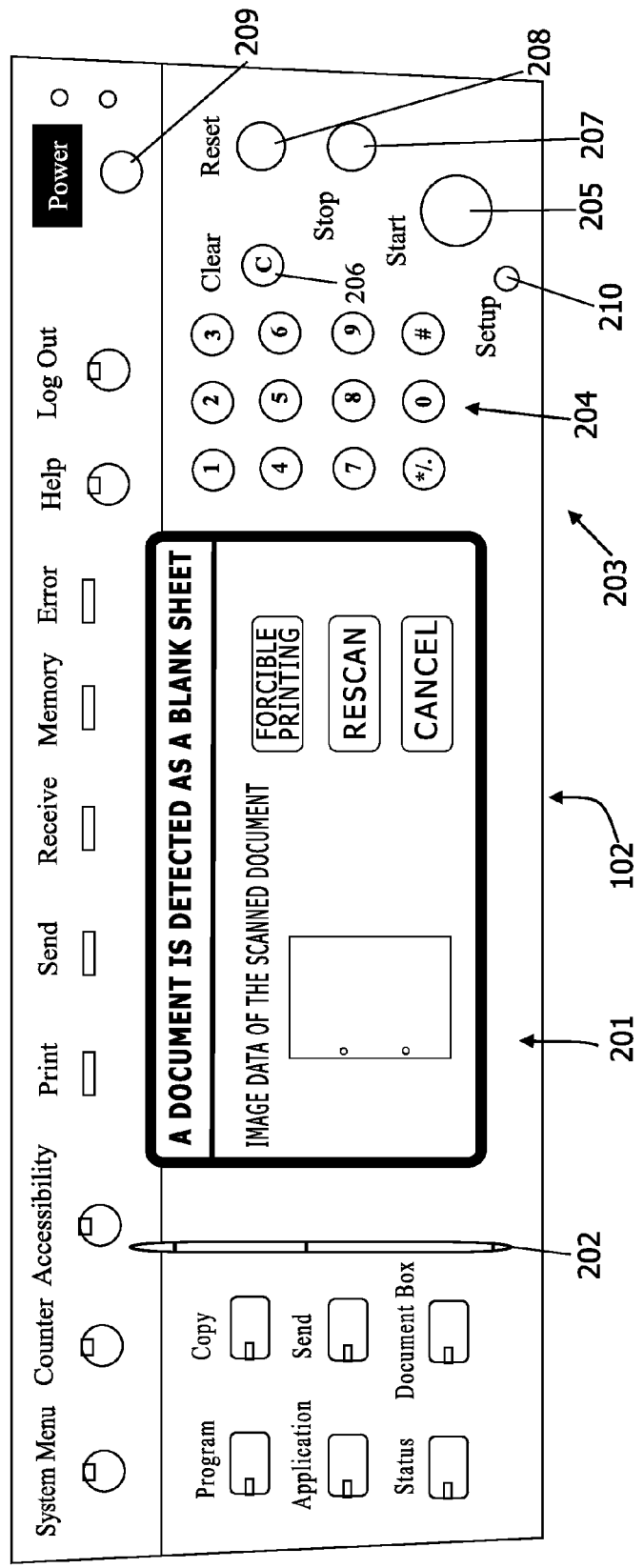
FIG. 2 shows a diagram which indicates a whole configuration of an operation unit according to the embodiment of the present disclosure.

FIG. 2 shows a diagram which indicates a whole configuration of an operation unit according to the embodiment of the present disclosure. A user uses the operation unit 102 to input a setting condition such as the aforementioned setting condition for image forming and to confirm the inputted setting condition. The operation unit 102 includes a touch panel 201 (an operation panel), a touch pen 202, and an operation key 203 which are used for a user to input a setting condition.

Therefore, the touch panel 201 has a function to input a setting condition, and a function to display the setting condition. Therefore, pressing down a key on a screen displayed on the touch panel 201 inputs a setting condition corresponding to the pressed-down key.

A display unit (not shown) such as an LCD (Liquid Crystal Display) is arranged beneath the touch panel 201, and the display unit displays, for example, an operation screen such as an initial screen. A touch pen 202 is arranged near the touch panel 201, and when a user touches the tip of the touch pen 202 to the touch panel 201, a sensor arranged on an underside of the touch panel 201 detects a touched position.

Further, the operation keys 203 are arranged near the touch panel 201, such as numeric keys 204, a start key 205, a clear key 206, a stop key 207, a reset key 208, and a power key 209.

Figure 3:
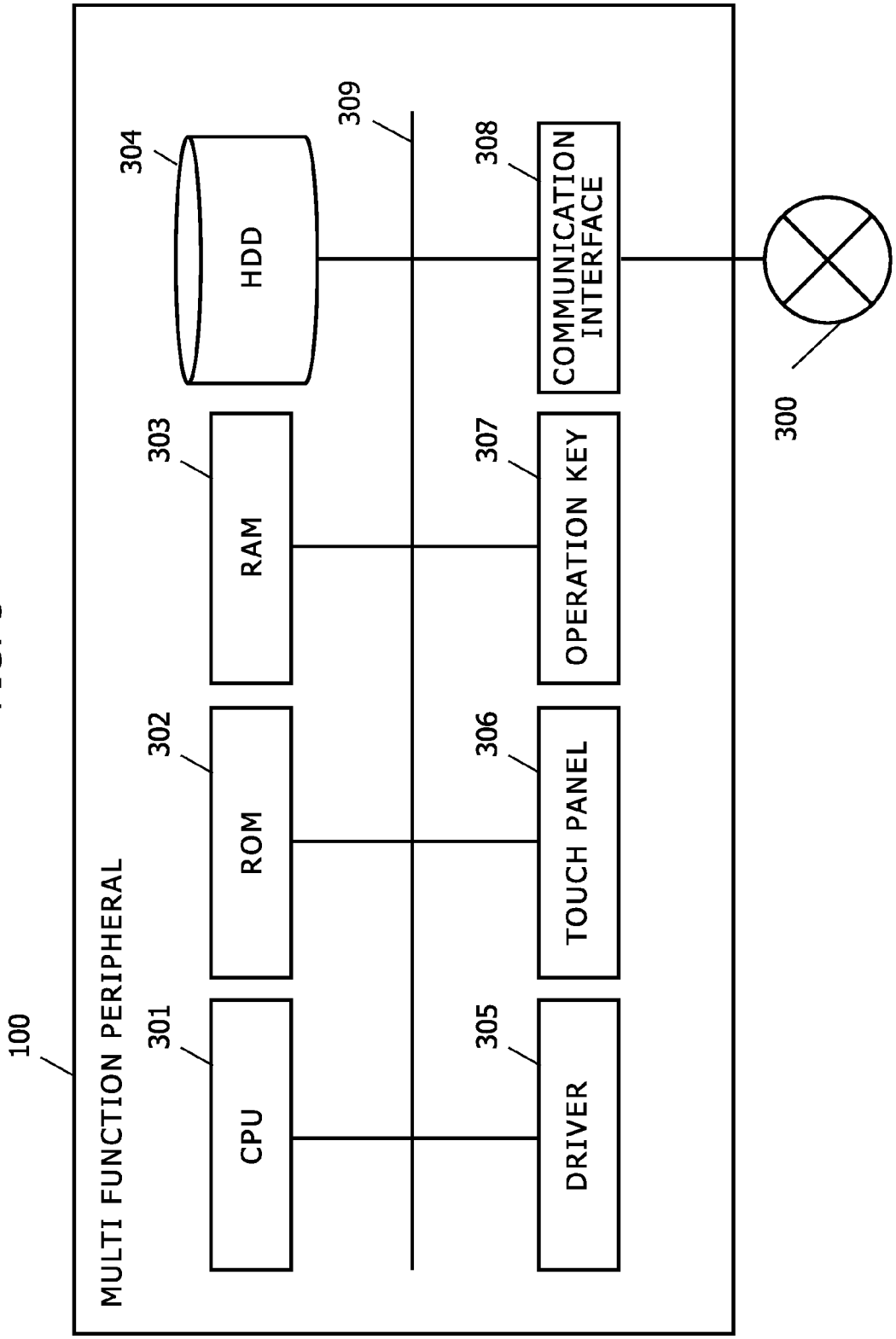
FIG. 3 shows a schematic diagram which indicates a hardware configuration of a control system in the multi function peripheral according to the embodiment of the present disclosure.

In the next part, a configuration of a control system in the multi function peripheral 100 is explained. FIG. 3 shows a schematic diagram which indicates a hardware configuration of a control system in the multi function peripheral according to the embodiment of the present disclosure.

In a control circuit of the multifunction peripheral 100, an internal bus 309 connects a CPU (Central Processing Unit) 301, a ROM (Read Only Memory) 302, a RAM (Random Access Memory) 303, an HDD (Hard Disk Drive) 304, and drivers 305 corresponding to respective driving units, the touch panel 306 (201), the operation keys 307 (203), and the communication interface 308 (200).

The CPU 301 uses the RAM 303, for example, as a work area, executes a program stored in the ROM 302, the HDD 304, or the like, transmits/receives data and instruction to/from the drivers 305 and the touch panel 306 on the basis of the execution, and controls actions of the driving units shown in FIG. 1. Further, the CPU 301 performs a predetermined blank sheet detection on the generated image data. Furthermore, the communication interface 308 connects via the network 300 to a facsimile machine, and the CPU 301 transmits image data via the communication interface 308 to the facsimile machine.

In addition, the CPU 301 also forms units mentioned below other than the aforementioned driving units (shown in FIG. 4) by executing a program. A program and data to form the units mentioned below are stored in the ROM 302, the HDD 304, and so forth.

EMBODIMENT OF THE PRESENT DISCLOSURE

Figure 4:
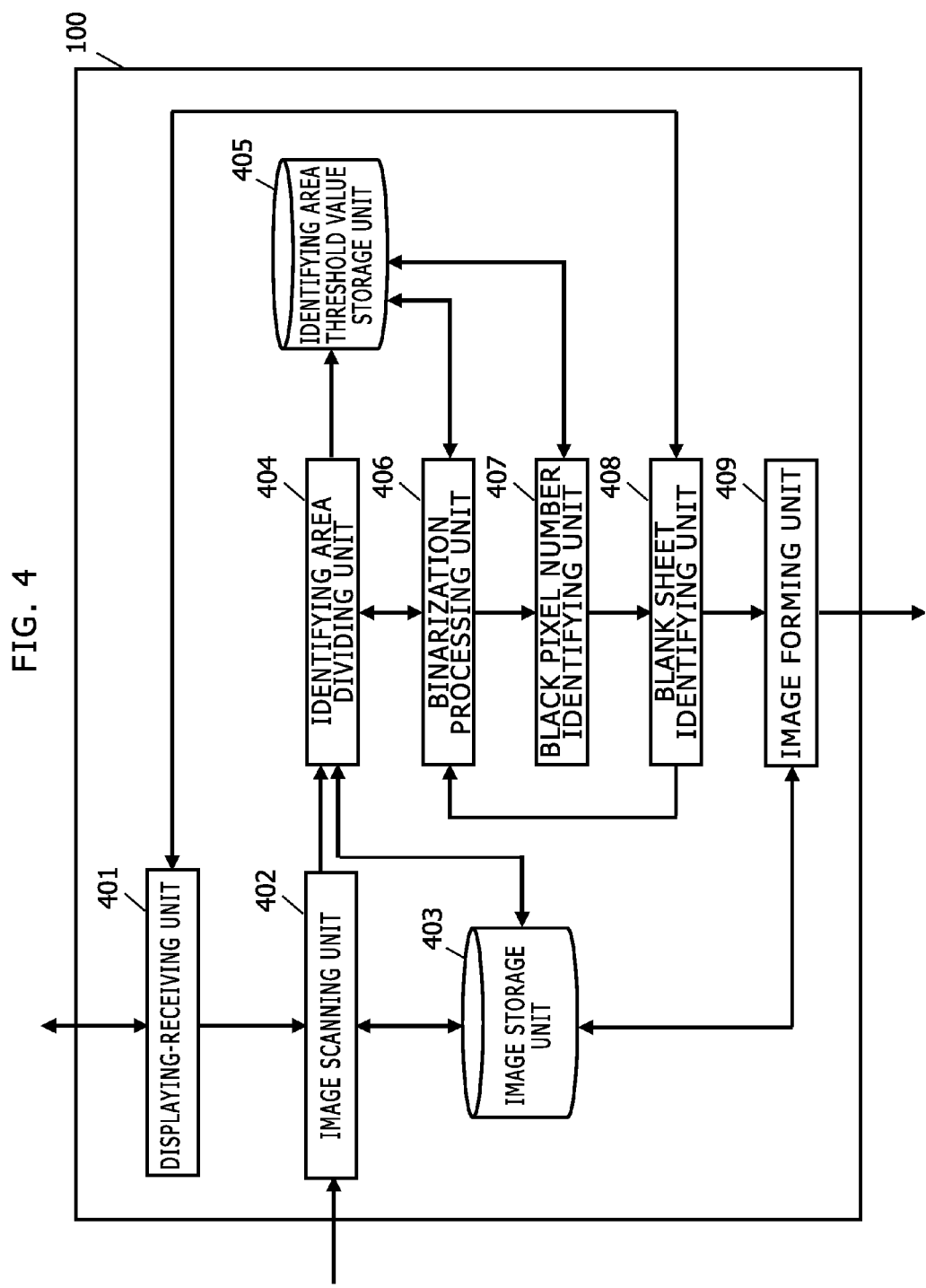
FIG. 4 shows a functional block diagram of the multi function peripheral according to the embodiment of the present disclosure.

Referring to FIGS. 4 and 5, a configuration and execution procedures of the embodiment of the present disclosure are explained. FIG. 4 shows a functional block diagram of the multi function peripheral according to the embodiment of the present disclosure. FIG. 5 shows a flowchart which indicates execution procedures in the embodiment of the present disclosure.

Firstly, when a user puts a document on the platen glass 101 of the multi function peripheral 100, inputs a setting condition of image forming and presses down a start key using the operation unit 102, a displaying-receiving unit 401 of the multi function peripheral 100 receives this pressing-down operation to the start key (YES at Step S101 in FIG. 5), and informs it to an image scanning unit 402. Upon receiving it, the image scanning unit 402 scans a document image of the document put on the platen glass 101 to generate its image data, and stores the image data of the scanned document in an image storage unit 403 (Step S102 in FIG. 5). It should be noted that in the embodiment of the present disclosure the image data is assumed as monochrome one.

When the image scanning unit 402 finishes generating and storing the image data of the document, the image scanning unit 402 informs it to an identifying area dividing unit 404. Upon receiving it, the identifying area dividing unit 404 divides the image data of the document into plural identifying areas (Step S103 in FIG. 5).

The identifying area dividing unit 404 may divide the image data of the document into plural identifying areas in any sort of manner such as referring to an identifying area threshold value table which has been stored in an identifying area threshold value storage unit 405.

Figure 6A:
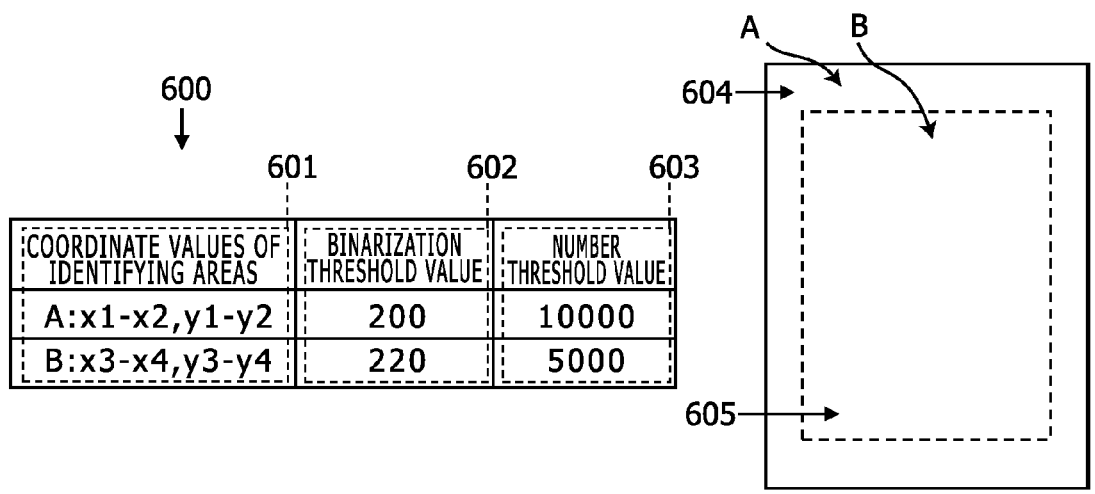
FIG. 6A shows an example of an identifying area threshold value table in the embodiment of the present disclosure.

As shown in FIG. 6A, in an identifying area threshold value table 600, an identifying area coordinate values 601, a binarization threshold value 602, and a number threshold value 603 have been stored so as to be related with each other. The identifying area coordinate values 601 (e.g. "A: x1-x2, y1-y2") indicate a position (a range) of an identifying area obtained by dividing the image data. The binarization threshold value 602 (e.g. "200" when the density value of white is 255 and the density value of black is 0) is used in a binarization process for the identifying area. The number threshold value 603 (e.g. "1000") is used in a blank sheet identifying process for the identifying area.

As shown in FIG. 6A, among the identifying area coordinate values 601, coordinate values (e.g. "A: x1-x2, y1-y2") of an outer frame area 604 and coordinate values (e.g. "B: x3-x4, y3-y4") of an internal area 605 have been preset. The outer frame area 604 is an area with a predetermined width from the outer edge which may contain an image such as punch holes or stable marks not related with content of the document. The internal area 605 is an area which may contain an image such as a text, a photograph, or a figure related with content of the document.

The binarization threshold value 602, here "200", corresponding to the coordinate values 601 of the outer frame area 604 is set so as to be closer to the density value of black, here "0", than the binarization threshold value 602, here "220", corresponding to the coordinate values 601 of the internal area 605 (as mentioned below).

Further, the number threshold value 603, here "10000", corresponding to the coordinate values 601 of the outer frame area 604 is set so as to be larger than the number threshold value 603, here "5000", corresponding to the coordinate values 601 of the internal area 605 (as mentioned below).

Meanwhile, the identifying area dividing unit 404 obtains the identifying area coordinate values 601 in the identifying area threshold value table 600, and divides the image data into plural (here, two) identifying areas on the basis of the coordinate values 601.

When the identifying area dividing unit 404 finishes dividing the image data, the identifying area dividing unit 404 informs it to a binarization processing unit 406. Upon receiving it, for the identifying area obtained by dividing the image data, the binarization processing unit 406 performs a binarization process with the binarization threshold value preset to this identifying area (Step S104 in FIG. 5).

For example, the binarization processing unit 406 obtains the binarization threshold value 602, here "200", corresponding to the outer frame area 605 by referring to the identifying area threshold value table 600 with specifying an identifying area, here the outer frame area 605, among plural identifying areas obtained by dividing the image data. Subsequently, the binarization processing unit 406 focuses on a pixel in the outer frame area 604, and compares a density value of this pixel with the obtained binarization threshold value 602, here "200". If the density value of this pixel is larger than the binarization threshold value 602 (i.e. if the density value of this pixel is close to the density value of white rather than the density value of black), then the binarization processing unit 406 changes the density value of this pixel to the density value of white; and if the density value of this pixel is either equal to or less than the binarization threshold value 602 (i.e. if the density value of this pixel is close to the density value of black rather than the density value of white), then the binarization processing unit 406 changes the density value of this pixel to the density value of black. The binarization processing unit 406 performs such a pixel value changing process for all pixels in the outer frame area 604.

Figure 6B:
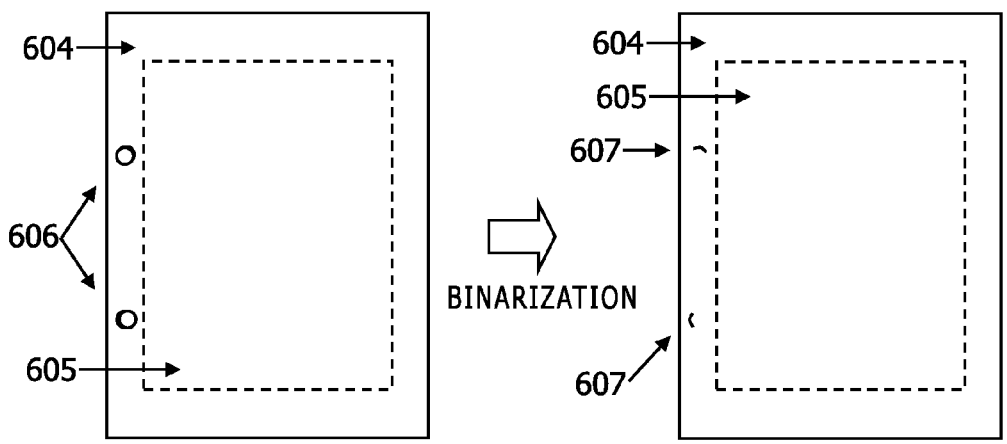
FIG. 6B shows an example of image data and a binarization process in the embodiment of the present disclosure.

For example, when the binarization threshold value 602 corresponding to the outer frame area 604, here "200", is set close to the density value of black, here "0", as shown in FIG. 6B, if the image data of the document includes images of two punch holes 606 near the left edge in the outer frame area 604, density values of only pixels significantly close to the density value of black in images of the two punch holes 606 are changed to the density value of black. Therefore, even though the images of the two punch holes 606 are included, after the binarization process, the outer frame area 604 contains a significant small number of pixels which have the density value of black, and is close to a blank area.

Meanwhile, when the binarization processing unit 406 finishes the binarization process for the identifying area, the binarization processing unit 406 informs it to a black pixel number identifying unit 407. Upon receiving it, the black pixel number identifying unit 407 identifies whether or not the number of pixels which have the density value of black, here "0", in the binarized identifying area exceeds the number threshold value preset to this identifying area.

Specifically, the black pixel number identifying unit 407 counts the number of pixels which have the density value of black, here "0" among pixels in the binarized outer frame area 604 (Step S105 in FIG. 5), and obtains the number threshold value 603 corresponding to the outer frame area 604, here "10000" by referring to the identifying area threshold value table 600. Subsequently, the black pixel number identifying unit 407 identifies whether or not the counted number of pixels which have the density value of black, here "0" exceeds the obtained number threshold value 603, here "10000" (Step S106 in FIG. 5).

As shown in FIG. 6B, in the binarized outer frame area 604, the number of black pixels is significantly small due to the setting of the binarization threshold value 602. Further, if the number threshold value 603 corresponding to the outer frame area 604 (here "10000") is set as a large value, then the number of the pixels which have the density value of black tends not to exceed the number threshold value 603, here "10000". Therefore, even though the images of the two punch holes 606 are included, the outer frame area 604 tends to be identified as a blank area.

According to the identification, if the number of pixels which have the density value of black, here "0", does not exceed the number threshold value, here "10000", then the black pixel number identifying unit 407 identifies that the outer frame area 604 is a blank area (NO at Step S106 in FIG. 5).

Therefore, even if the image data of the document contains the images of the two punch holes 606 not related with content of the document in its left edge part, the outer frame area 604 including the left edge part is not identified as a document area but as a blank area by adjusting the binarization threshold value 602 and the number threshold value 603 as a blank sheet identification condition. Consequently, a user desired result is obtained in the identification.

If the black pixel number identifying unit 407 identifies that the outer frame area 604 is a blank area (NO at Step S106 in FIG. 5), then the black pixel number identifying unit 407 informs it to a blank sheet identifying unit 408. Upon receiving it, the blank sheet identifying unit 408 identifies whether or not the binarization and the identification on the number of black pixels are performed for all of the plural identifying areas (Step S107 in FIG. 5).

In the current status, the binarization and the identification on the number of black pixels are performed for only the outer frame area 604, and therefore, the blank sheet identifying unit 408 identifies that the binarization and the identification on the number of black pixels are not performed for all of the plural identifying areas (NO at Step S107 in FIG. 5), returns to Step S104, causes the binarization processing unit 406 to binarize another identifying area (Step S104 in FIG. 5), and causes the black pixel number identifying unit 407 to perform the identification on the number of black pixels for this another identifying area (Steps S105 to S106 in FIG. 5).

Since in the current status, the binarization and the identification on the number of black pixels have not performed for the internal area 605, the binarization processing unit 406 will binarize the internal area 605 with the binarization threshold value 602, here "220", corresponding to the internal area 605 (Step S104 in FIG. 5), and the black pixel number identifying unit 407 will perform the identification on the number of black pixels for the internal area 605 with the number threshold value 603, here "5000", corresponding to the internal area 605 (Steps S105 to S106 in FIG. 5).

As shown in FIG. 6B, even though the image data of the document includes images of two punch holes 606 near the left edge inside of the outer frame area 604, the binarized internal area 605 contains almost no (or no) black pixels, and therefore, the black pixel number identifying unit 407 identifies that the number of pixels which have the density value of black, here "0", does not exceed the number threshold value 603, here "5000", and identifies that the internal area 605 is a blank area (NO at Step S106 in FIG. 5).

In the current status, the binarization and the identification on the number of black pixels are performed for all of the identifying areas, and therefore, the blank sheet identifying unit 408 identifies that the binarization and the identification on the number of black pixels are performed for all of the plural identifying areas (YES at Step S107 in FIG. 5), namely identifies that all of the identifying areas are blank areas, and causes the displaying-receiving unit 401 to display a blank sheet screen which indicates that the image of the document is a blank sheet (Steps S108 in FIG. 5). The displaying-receiving unit 401 displays the blank sheet screen on the touch panel 201.

As shown in FIG. 7A, in the blank sheet screen 700, a message 701 which indicates that the image data of the document is identified as image data of a blank sheet, a preview image 702 of the image data of this document, a forcible output key 703 to forcibly output (i.e. perform image forming) on the basis of the image data of the document, a rescan key 704 to start to rescan the document, and a cancel key 705 are displayed.

Therefore, while a user is looking at the blank sheet screen 700 (the preview image 702), the user can consider forcibly outputting, rescanning, and canceling.

As mentioned, when scanning a document which contains only punch holes, even though in an ordinary manner it is not identified as a blank sheet due to the punch holes, the present disclosure enables a document which a user wants to identify as a blank sheet to be identified as a blank sheet.

Meanwhile, as shown in FIG. 7B, if pale characters 706 such as characters written with a pencil are written near the center on a document, then the document is processed as follows.

In this case, in Step S103, when image data of the document is generated, the identifying area dividing unit 404 divides the image data into plural identifying areas (the outer frame area 604 and the internal area 605), and for these identifying areas, the binarization processing unit 406 performs binarization processes with the respective binarization threshold values 602 preset to these identifying areas (Step S104 in FIG. 5).

The binarization processing unit 406 obtains the binarization threshold value 602, here "220", corresponding to the internal area 605, and if a density value of a pixel in the internal area 605 is larger than the binarization threshold value 602, here "220", then the binarization processing unit 406 changes the density value of this pixel to the density value of white; and if a density value of a pixel in the internal area 605 is either equal to or less than the binarization threshold value 602, here "220", then the binarization processing unit 406 changes the density value of this pixel to the density value of black. If this binarization threshold value 602, here "220" is set close to the density value of white, here "255", all of the pale characters 706 are changed to characters 707 which have the density value of black as shown in FIG. 7B. Therefore, even though the pale characters 706 are included, the binarized internal area 605 contains a significantly large number of pixels which have the density value of black and is close to a non-blank area (i.e. a document area).

After the binarization processing unit 406 finishes a binarization process for the internal area 605, the black pixel number identifying unit 407 counts the number of pixels which have the density value of black, here "0", in the binarized internal area 605 (Step S105 in FIG. 5), and identifies whether or not the counted number of pixels which have the density value of black, here "0", exceeds the number threshold value 603, here "5000", corresponding to the internal area 605 (Step S106 in FIG. 5).

As shown in FIG. 7B, in the binarized internal area 605, the number of black pixels is significantly large due to the setting of the binarization threshold value 602. Further, if the number threshold value 603 corresponding to the internal area 605 (here "5000") is set as a small value, then the number of the pixels which have the density value of black, here "0" tends to exceed the number threshold value 603, here "5000". Therefore, even though the images of the pale characters 706 are included, the internal area 605 tends to be identified as a document area.

According to the identification, if the number of pixels which have the density value of black, here "0", exceeds the number threshold value, here "5000", then the black pixel number identifying unit 407 identifies that the internal area 605 is a document area (YES at Step S106 in FIG. 5).

Therefore, even if the image data of the document contains the images of the pale characters 706, the internal area 605 is not identified as a blank area but as a document area by adjusting the binarization threshold value 602 and the number threshold value 603 as a blank sheet identification condition. Consequently, a user desired result is obtained in the identification.

If the black pixel number identifying unit 407 identifies that the internal area 605 is a document area (YES at Step S106 in FIG. 5), then the black pixel number identifying unit 407 informs it to the blank sheet identifying unit 408. Upon receiving it, the blank sheet identifying unit 408 identifies that the image data of the document is not image data of a blank sheet, without identifying whether or not the binarization and the identification on the number of black pixels are performed for all of the plural identifying areas (Step S109 in FIG. 5). Here the blank sheet identifying process is finished.

This is due to the reason that in image data of a document if at least one identifying area is not a blank area then the whole image data is not image data of a blank sheet, and therefore, it is meaningless to perform the binarization and the identification on the number of black pixels for another identifying area. Therefore, an unnecessary process is canceled, and a time required for the whole process is shortened and more efficient.

If the blank sheet identifying unit 408 identifies that the image data of the document is not image data of a blank sheet, the blank sheet identifying unit 408 informs it to an image forming unit 409. Upon receiving it, the image forming unit 409 obtains the image data from the image storage unit 403, and performs image forming on the basis of the inputted setting condition.

Therefore, it is possible to perform image forming on the basis of only image data not identified as image data of a blank sheet, and consequently, unnecessary image forming is not performed.

Of course, in Step S108, if a user presses down the forcible output key 703, then image forming is performed on the basis of the image data, and therefore, it does not occur that image forming is not performed against user's will.

As mentioned, the multi function peripheral 100 of the present disclosure includes: the identifying area dividing unit 404 which divides the image data into plural identifying areas; the binarization processing unit 406 which performs a binarization process for the identifying areas with respective binarization threshold values preset for the identifying areas; the black pixel number identifying unit 407 which identifies whether or not the numbers of pixels with a density value of black in the respective identifying area exceed respective number threshold values preset for the identifying areas; and the blank sheet identifying unit 408 which identifies that the image data is image data of a blank sheet if the black pixel number identifying unit identifies that none of the numbers of pixels with the density value of black in the respective identifying areas exceeds the number threshold value.

Therefore, since the binarization threshold value and the number threshold value are set to each of the identifying areas to which the image data is divided, adjusting them enables to identify whichever of that image data of a document is identified as image data of a blank sheet and that image data of a document is not identified as image data of a blank sheet. Consequently, a user desired result is obtained in the blank sheet identification. Further, proper adjustment of the binarization threshold value and the number threshold value enables to precisely identify image data of a document as image data of a blank sheet.

The description of the present invention has been presented for purposes of illustration and description, and is not intended to be exhaustive or limited to the invention in the form disclosed.

Figure 8A:
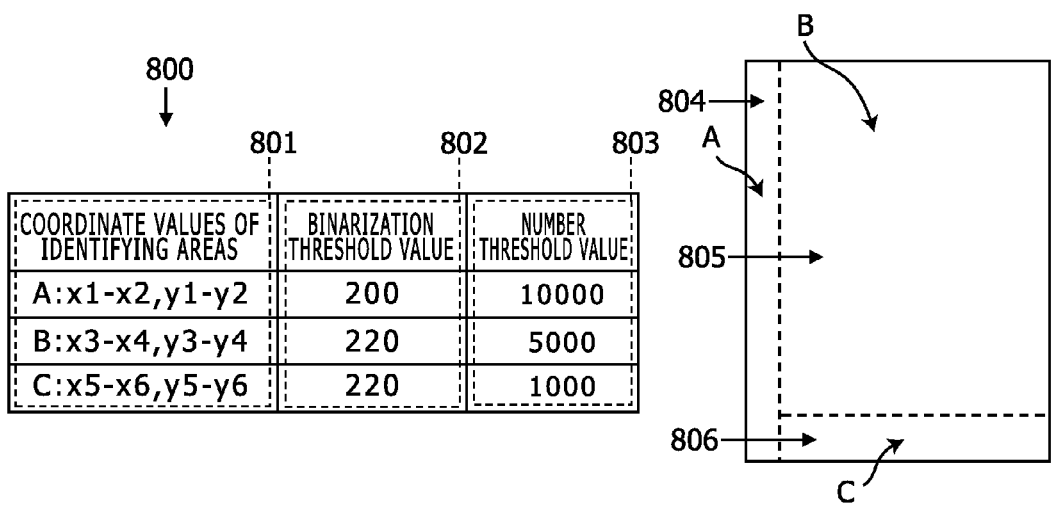
FIG. 8A shows an example of an identifying area threshold value table in the embodiment of the present disclosure.

In the embodiment of the present disclosure, the identifying area dividing unit 404 is configured to divide the image data to two identifying areas. Alternatively, another configuration may be available. For example, as shown in FIG. 8A, the identifying area dividing unit 404 may be configured to divide the image data to three identifying areas. In this case, as shown in FIG. 8A, among the identifying area coordinate values 801, coordinate values (e.g. "A: x1-x2, y1-y2") of a left edge part area 804, coordinate values (e.g. "B: x3-x4, y3-y4") of an internal area 805, and coordinate values (e.g. "C: x5-x6, y5-y6") of a bottom edge part area 806 have been preset. The left edge part area 804 is an area with a predetermined width from the left edge which may contain an image such as punch holes or stable marks not related with content of the document. The internal area 805 is an area which may contain an image such as a text, a photograph, or a figure related with content of the document. The bottom edge part area 806 is an area with a predetermined width from the bottom edge which may contain an image such as a page number and a company name related with content of the document.

A binarization threshold value 802, here "200", corresponding to the coordinate values 801 of the left edge part area 804 and a binarization threshold value 802, here "220", corresponding to the coordinate values 801 of the internal area 805 are identical to ones corresponding to coordinate values of the aforementioned outer frame area and the aforementioned internal area. In addition, a binarization threshold value 802, here "220", corresponding to the coordinate values 801 of the bottom edge part area 806, is set closer to the density value of white, here "255", than the binarization threshold value 802, here "200", corresponding to the coordinate values 801 of the left edge part area 804.

Figure 8B:
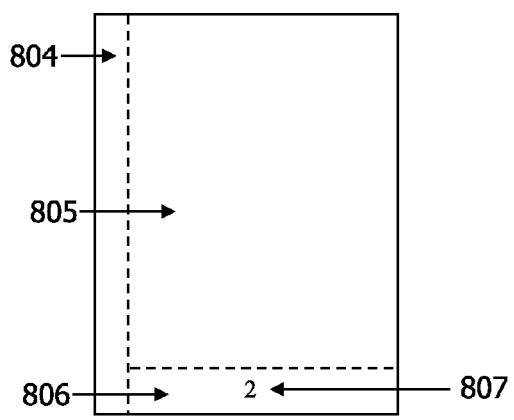
FIG. 8B shows an example of image data and a binarization process in the embodiment of the present disclosure.

Therefore, as shown in FIG. 8B, even if an image 807 such as a page number contains a relatively small number of pixels which have the density of black, it is possible to gain the number of pixels which have the density of black by changing density values of as many pixels as possible in the image 807 to the density value of black.

Further, a number threshold value 803, here "10000", corresponding to the coordinate values 801 of the left edge part area 804 and a number threshold value 803, here "5000", corresponding to the coordinate values 801 of the internal area 805 are identical to ones corresponding to coordinate values of the aforementioned outer frame area and the aforementioned internal area. In addition, a number threshold value 803, here "1000", corresponding to the coordinate values 801 of the bottom edge part area 806 is set so as to be less than the number threshold values 803, here "10000" and "5000", corresponding to the coordinate values 801 of the left edge part area 804 and the internal area 805.

Therefore, as shown in FIG. 8B, when a page number like the image 807 is included, if the number threshold value 803 corresponding to the coordinate values 801 of the bottom edge part area 806 is set as a small number, then the number of pixels which have the density value of black tends to exceed the small number threshold value 803 corresponding to the coordinate values 801 of the internal area 805. Therefore, even if the image 807 is a small character such as a page number, the bottom edge part area 806 tends to be identified as a non-blank area, that is, a document area. Consequently, as shown in FIG. 8B, even if image data of a document contains only a page number, it is identified that the image data of the document is not image data of a blank sheet; and when plural sheets of documents are continuously scanned, even if the document contains only a page number, the document is not identified as a blank sheet but identified as a document sheet, and consequently page continuity of the documents is not damaged.

Further, the embodiment of the present disclosure is configured so that the binarization processing unit 406 uses a preset binarization threshold value and the black pixel number identifying unit 407 uses a preset number threshold value. Alternatively, the embodiment of the present disclosure may be configured in another manner. For example, it may be configured so that when scanning the document, the displaying-receiving unit 401 displays a binarization threshold value and a number threshold value so as to enable a user to change the values, and receives input of the binarization threshold value and the number threshold value from the user; and the binarization processing unit 406 uses the inputted binarization threshold value and the black pixel number identifying unit 407 uses the inputted number threshold value. Further, it may be configured to enable an administrator to input the binarization threshold value and the number threshold value; and it may be configured to automatically determine the binarization threshold value and the number threshold value according to a type of the image data.

Further, the embodiment of the present disclosure is configured so that even if the blank sheet identifying unit 408 identifies that image data of a document is image data of a blank sheet, it is possible to forcibly proceed image forming. Alternatively, if it is identified that image data of a document is image data of a blank sheet, all of the processes are suspended in order to unable to perform image forming. In this configuration, for example, unnecessary image forming is not performed and if the image forming is for facsimile transmission, unnecessary transmission is not performed. If the image forming is for facsimile transmission, the network 300 is used.

Further, the aforementioned embodiment is configured so that the generated image data is of monochrome which expresses brightness from white to black and does not includes color information, and the density of a pixel expresses gray of 8 bit number i.e. 256 gradation levels, but the image data is not limited to this manner. For example, the image data may be color data of RGB digital data from white through red, green and blue to black which expresses only brightness.

Furthermore, the embodiment of the present disclosure is configured to perform image forming on the basis of the image data. Alternatively, it may be configured to perform any other function which uses the image data, such as a copy function, a facsimile communication function, a scan function, a print function, or a memory box function.

Furthermore, in the aforementioned embodiment of the present disclosure, a program may be stored in a recording medium to form the aforementioned units of the multi function peripheral 100, and a configuration may be available in which the recording medium may be provided. In the configuration, the multi function peripheral 100 reads out the program and forms the aforementioned units using the program. In such a case, a central processing unit (CPU) performs a control action together with each of circuits other than the CPU in accordance with a program. Further, the units formed with the program and the CPU may be configured of specific hardware. Further, this program can be circulated as a computer readable recording medium such as a CD-ROM in which the program has been recorded.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus generating image data of a document, comprising a processor, coupled to a memory, which functions as:
   an identifying area dividing unit configured to divide the image data into plural identifying areas; wherein said identifying area dividing unit will identify a first, second and third areas as part of the plural identifying areas; said first area comprising of a left edge part; said second area comprising of a bottom edge; said third area comprising of an internal area;
   a binarization processing unit configured to perform a binarization process for the identifying areas with respective binarization threshold values preset for the identifying areas; wherein the binarization threshold value of the first area is closer to the density value of black than the binarization threshold value of the second and third areas;
   a black pixel number identifying unit configured to identify whether or not the numbers of pixels with a density value of black in the respective identifying area exceed respective number threshold values preset for the identifying areas; and
   a blank sheet identifying unit configured to identify that the image data is image data of a blank sheet if the black pixel number identifying unit identifies that none of the numbers of pixels with the density value of black in the respective identifying areas exceeds the number threshold value.

2. The image processing apparatus according to claim 1, wherein:
   the blank sheet identifying unit is further configured to identify that the image data is not image data of a blank sheet if the black pixel number identifying unit identifies that at least one of the numbers of pixels with the density value of black in the respective identifying areas exceeds the number threshold value.

3. The image processing apparatus according to claim 1, wherein:
   the number threshold value of the identifying area that includes a left edge part area is larger than the number threshold value of the identifying area that includes an internal area.

4. An image processing method generating image data of a document, comprising the steps of:
   dividing the image data into plural identifying areas; said plural identifying areas comprising a first, second and third areas; said first area comprising of a left edge part; said second area comprising of a bottom edge; and said third area comprising of an internal area;
   performing a binarization process for the identifying areas with respective binarization threshold values preset for the identifying areas; wherein the binarization threshold value of the first area is closer to the density value of black than the binarization threshold value of the second and third areas;
   identifying whether or not the numbers of pixels with a density value of black in the respective identifying area exceed respective number threshold values preset for the identifying areas; and
   identifying that the image data is image data of a blank sheet if it is identified that none of the numbers of pixels with the density value of black in the respective identifying areas exceeds the number threshold value.

5. A non-transitory computer readable recording medium storing a program to cause a computer to perform the steps of:
   dividing the image data into plural identifying areas; said plural identifying areas comprising a first, second and third areas; said first area comprising of a left edge part; said second area comprising of a bottom edge; and said third area comprising of an internal area;
   performing a binarization process for the identifying areas with respective binarization threshold values preset for the identifying areas; wherein the binarization threshold value of the first area is closer to the density value of black than the binarization threshold value of the second and third areas;
   identifying whether or not the numbers of pixels with a density value of black in the respective identifying area exceed respective number threshold values preset for the identifying areas; and identifying that the image data is image data of a blank sheet if it is identified that none of the numbers of pixels with the density value of black in the respective identifying areas exceeds the number threshold value.

* * * * *